United States Patent [19]

Boster

[11] Patent Number: 4,964,646
[45] Date of Patent: Oct. 23, 1990

[54] FLUID HANDLING APPARATUS WITH SHAFT SLEEVE AND EXTENSION

[75] Inventor: Clark S. Boster, Whittier, Calif.

[73] Assignee: BW/IP International, Inc., Long Beach, Calif.

[21] Appl. No.: 328,675

[22] Filed: Mar. 27, 1989

[51] Int. Cl.$^5$ .................. F16K 41/00; B25G 3/00; F04O 29/00
[52] U.S. Cl. .................... 277/5; 277/65; 403/286; 403/341; 415/231; 415/901
[58] Field of Search .................. 277/5, 6, 7, 8, 36, 277/59, 136, 65; 415/168.1, 168.2, 124.2, 229, 230, 231, 901, 903; 403/286, 287, 341, 356

[56] References Cited

U.S. PATENT DOCUMENTS

| | | | |
|---|---|---|---|
| 2,488,769 | 3/1949 | Engstrom | 277/8 |
| 2,945,711 | 7/1960 | Dykman | 277/5 X |
| 3,093,381 | 6/1963 | Schulz | 277/8 |
| 3,124,361 | 3/1964 | Haberland et al. | 277/8 |
| 3,166,330 | 1/1965 | Boutros | 277/8 |
| 3,363,910 | 1/1968 | Toronchuk | 277/5 |
| 3,715,169 | 2/1973 | Molis | 415/231 |
| 4,108,569 | 8/1978 | Ryall et al. | 415/168.2 X |
| 4,272,084 | 6/1981 | Martinson et al. | 277/30 |
| 4,375,291 | 3/1983 | Padgett | 277/58 X |
| 4,586,719 | 5/1986 | Marsi et al. | 277/41 |
| 4,722,663 | 2/1988 | Swearingen | 415/168.2 |

Primary Examiner—Allan N. Shoap
Assistant Examiner—Scott Cummings
Attorney, Agent, or Firm—Aubrey L. Burgess

[57] ABSTRACT

In a fluid handling appartus comprising a multi-stage mechanical seal assembly, an additional mechanical seal assembly to maintain a substantially constant exit pressure of leakage from the last stage of the multi-stage mechanical seal assembly, and a novel driving arrangement between the motor and the fluid machine.

14 Claims, 5 Drawing Sheets

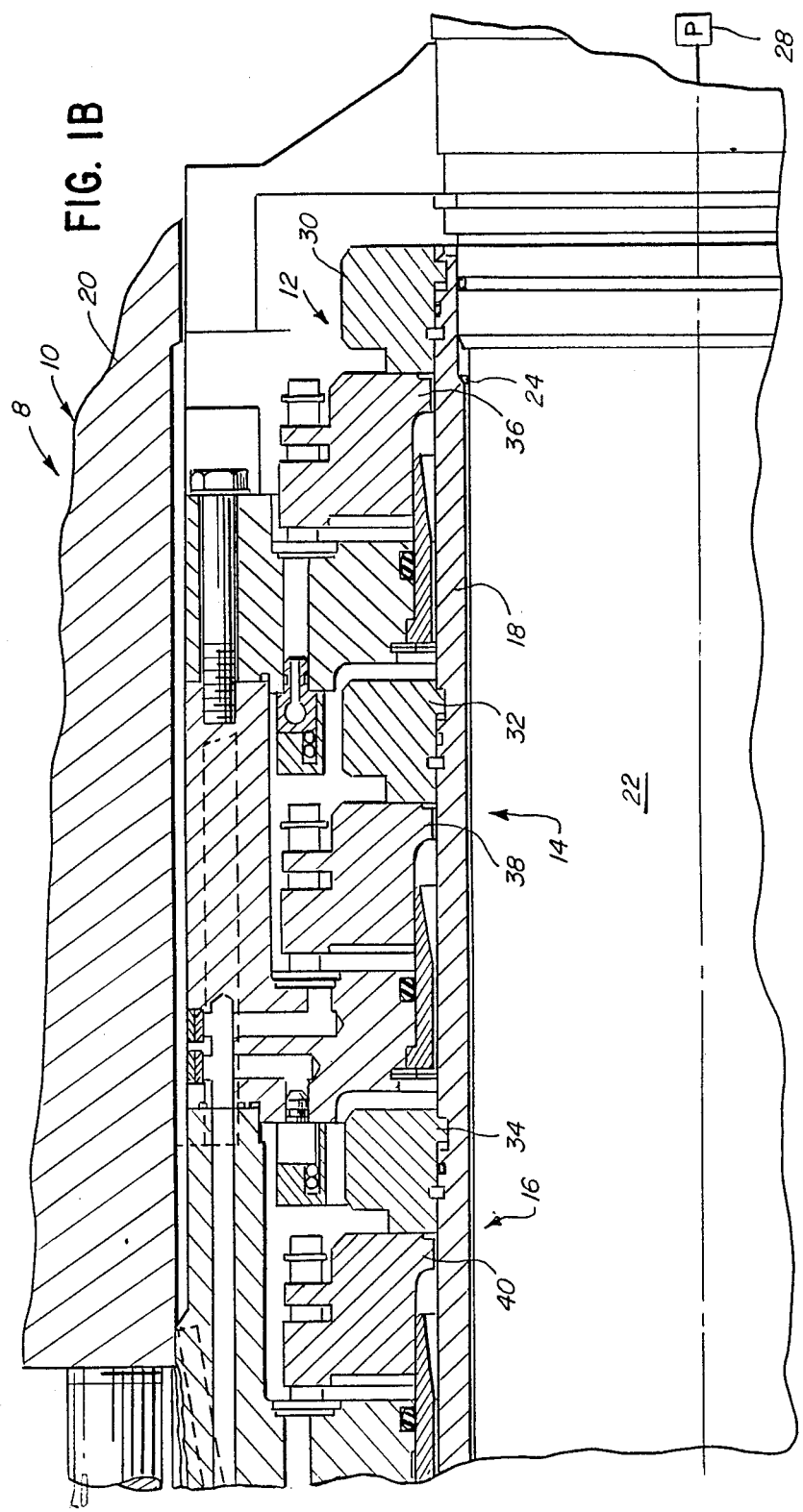

FLUID HANDLING APPARATUS WITH SHAFT SLEEVE AND EXTENSION

BACKGROUND OF THE INVENTION

1. FIELD OF INVENTION

This invention relates to fluid handling apparatus or machines, such as pumps and the like, driven by a motor and a shaft means. A multi-stage mechanical seal assembly is located between the fluid handling apparatus or machine and the motor to progressively reduce the pressure of fluid leakage along the shaft and substantially prevent the leakage of product fluid to the motor. The invention is particulary concerned with the driving connection for the shaft sleeve between the fluid machine and the motor.

2. BACKGROUND DISCUSSION

Multi-stage mechanical seal assemblies are widely used with nuclear reactor coolant pumps, boiler recirculating pumps, boiler feed pumps and pipeline pumps (to name a few of the uses), and will meet the requirements for extreme and widely changing pressures and temperatures encountered in these uses. It is to be understood that the present invention can also be used in less demanding installations. Additional discussion of operating conditions is found in Marsi et al Pat. No. 4,586,719, issued May 6, 1986, which is incorporated herein by reference.

The multi-stage mechanical seal assembly, as described in the aforesaid Marsi et al patent comprises a plurality of seal stages, each comprising a rotatable seal ring and a non-rotatable seal ring, each seal ring having a radial seal face with the faces of the rotating and non-rotating seal rings of each seal stage opposing one another. The multi-stage mechanical seal assembly of the aforesaid patent is constructed as a cartridge and is assembled onto a seal sleeve received on the shaft of the fluid machine. The seal sleeve is connected to the shaft to rotate therewith. The fluid machine shaft and the seal sleeve are generally drivingly connected to the motor by means of a cylindrical coupling.

In previous constructions, a single key was used for torsionally coupling a one-piece connective sleeve. One or two pins at the lower end of the connective sleeve locked the lower sleeve to the upper connective sleeve. This type of connective means has been found to be unsuitable for the inventive seal arrangements being described herein.

DESCRIPTION OF PRIOR ART

Marsi et al, U.S. Pat. No. 4,586,719, relates to a multi-stage mechanical seal assembly constructed as a cartridge on a seal sleeve received on the shaft of the fluid machine, such as a pump. The seal sleeve is connected to the shaft, so as to rotate therewith. While not described in detail, a driving connection must be provided between the seal sleeve and shaft and the motor.

Martinson et al, U.S. Pat. No. 4,272,084, teaches a multistage mechanical seal assembly in which each stage has its own sleeve, the sleeves surrounding the fluid machines, shaft for rotation therewith. A coupling is provided between the shaft of the fluid machine and a motor, the coupling being connected to the last stage of the multi-stage mechanical seal.

SUMMARY OF THE INVENTION

In order to provide a substantially constant exit pressure of fluid from the last stage of the multi-stage mechanical seal, it is proposed, according to this invention, to add an additional mechanical seal assembly and to modify the driving connection between the motor coupling and the seal sleeve and shaft. In addition to the function of the additional mechanical seal assembly, the modification of the driving connection prevents a "lock-up" of the connection which would prevent its removal from the apparatus. "Lock-up", as used herein, is intended to mean that the threaded connection could progressively tighten and possibly seize or gall and thus prevent its removal. The inter- locks prevent motion of the sleeves relative to one another.

Because of space limitations when installing or removing the multi-stage mechanical seal assembly cartridge, the additional mechanical seal assembly is assembled and/or disassembled in situ part by part. Thus in order to provide a positive driving connection between the seal sleeve and shaft and the motor coupling, a novel connecting structure is provided, one portion transmitting the axial thrust from the fluid machine to the motor while another portion transmits torsional forces therebetween. The connecting structure is constructed to provide a positive driving connection between the shaft and seal sleeve and the motor coupling while limiting axial vibratory motion of a portion of the connecting structure.

More specifically, the invention broadly comprises, in a fluid handling device which comprises a fluid machine connected by a drive shaft and a coupling to a motor, the fluid handling device including a multi-stage mechanical seal assembly for progressively reducing the pressure of fluid leakage along the shaft from the first stage to the last stage of the multi-stage mechanical seal assembly in substantially equal increments, and means to vent the leakage to a collection zone. The multi-stage mechanical seal assembly is assembled on a seal sleeve which surrounds and rotates with the shaft, and according to the invention being described herein, an additional mechanical seal assembly for maintaining a substantially constant exit pressure from the last stage of the multi-stage mechanical seal assembly is provided, the additional mechanical seal assembly being at least partially housed in an auxiliary housing connected to the seal housing and/or pump cover. An extension sleeve is axially located between the drive shaft and the motor coupling, and means are provided to insure a positive driving connection between the extension sleeve and the seal sleeve. Means to provide a positive driving connection between the extension sleeve and the coupling are also included. A drive sleeve is axially located between the seal shaft and the coupling, the drive sleeve being encircled by the extension sleeve, and also included are means to provide a positive driving connection between the drive sleeve and the seal sleeve. Means are also included to provide a positive driving connection between the drive sleeve and the motor coupling. The drive sleeve transmits torsional forces between the seal shaft and the motor coupling and the extension sleeve transmits axial thrust to the seal sleeve.

BRIEF DESCRIPTION OF THE DRAWINGS

In the drawings wherein like reference characters refer to like parts.

DETAILED DESCRIPTION OF THE PREFERRED EMBODIMENT

Figure 1:
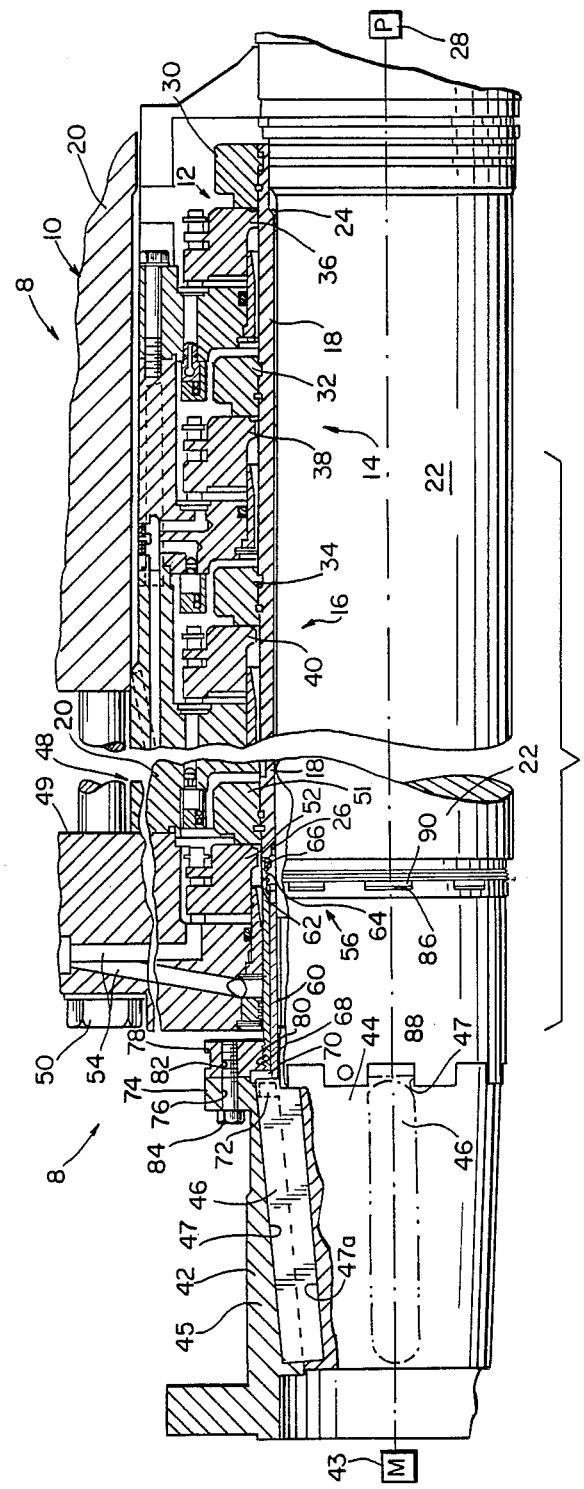
FIGS. 1 is, in a smaller scale, a composite of 1A and 1B, when assembled end to end illustrates, at least schematically, in longitudinal section, a multi-stage mechanical seal assembly and the means drivingly connecting the seal shaft and the seal sleeve to the motor coupling according to this invention, and further illustrated on a larger scale in FIGS. 1A and 1B when assembled end to end.
Figure 1A:
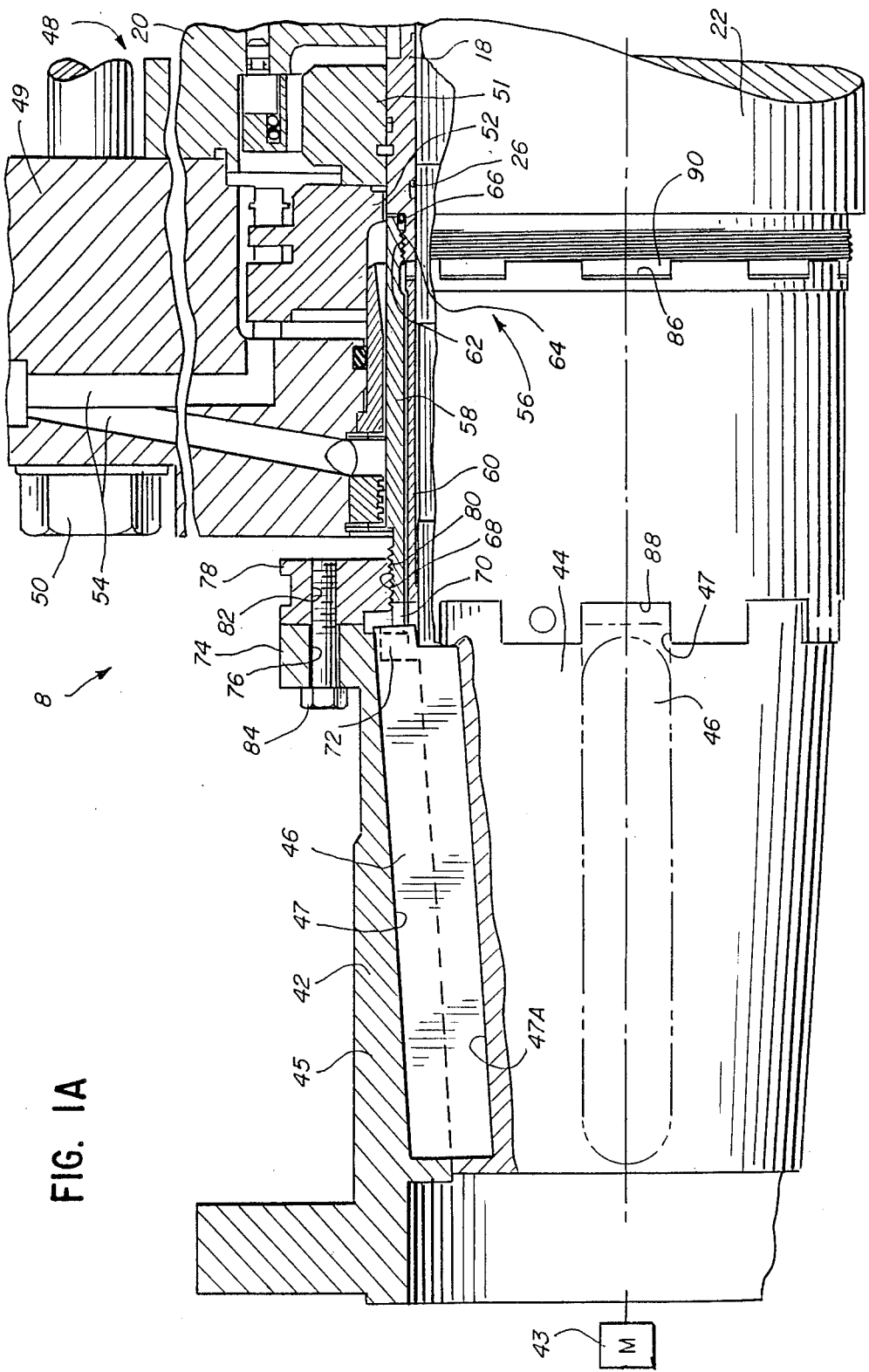
Figure 3:
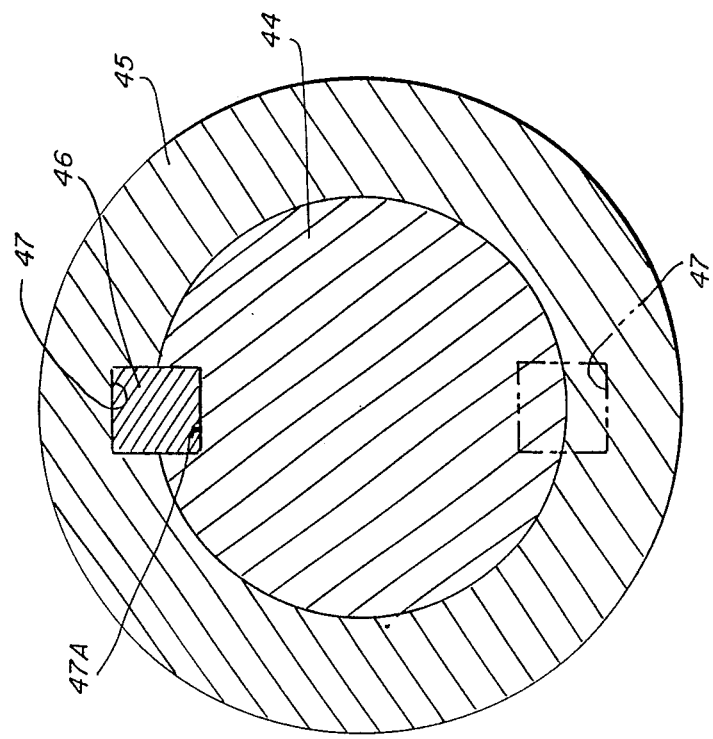
FIG. 3 is a cross-sectional view taken on line 3—3 of FIG. 2 showing details of the driving connection between the motor coupling and the seal shaft and seal sleeve.

Looking now at FIG. 1, FIGS. 1A and 1B, as assembled end to end there is illustrated a fluid handling apparatus 8 having a multi-stage mechanical seal assembly 10 comprising, in the embodiment illustrated, three stages of mechanical seals, a first stage 12, a second stage 14, and a third stage 16 assembled on a seal sleeve 18 and positioned in a housing or pump cover 20, which, in this embodiment, is constructed of multiple parts. The mechanical seal assembly 10, as illustrated, is preferably a cartridge type assembly, with its component parts preassembled on the sleeve 18. The seal sleeve encircles a fluid machine or seal shaft 22 and is sealed thereto by elastomeric O-rings 24, 26. The shaft 22 is connected to a fluid machine, such as a pump and the like, schematically indicated at 28. Each mechanical seal stage 12, 14, 16 comprises a rotatable seal ring 30, 32, 34, respectively, connected to the seal sleeve 18, and a non-rotatable seal ring 36, 38, 40, respectively, connected to the housing 20. For greater details of the construction of multi-stage mechanical seals, reference is made to the Marsi et al patent, previously identified, incorporated herein by reference. The shaft 22 and the seal sleeve 18 are drivingly connected to a coupling 42 connected to a motor 43, also schematically illustrated. The coupling 42 comprises a tapered and slotted inner member 44 and a cylindrical outer, flanged and slotted member 45 surrounding the sleeve member 44. Generally a pair of oppositely positioned keys 46 (see FIG. 3) are received in the keyways or slots 47, 47A, formed respectively, in members 45 and 44. However, a single key or a greater number of keys may be used if necessary and/or desirable.

In order to maintain a substantially constant exit pressure of leakage from the last stage of the multi-stage mechanical seal assembly 10, or in the embodiment illustrated and being herein described, the third stage, seal 16, an additional mechanical seal assembly 48 is provided. Because of space limitations when installing or removing the mechanical seal assembly 10, the seal assembly 48 is assembled part by part, in situ, as opposed to being a part of a cartridge which is factory assembled on a sleeve and the like, factory tested, and installed as a unit. The additional mechanical seal assembly 48 is at least partly housed in an auxiliary housing 49 connected by bolt means 50 to the housing 20. The additional mechanical seal assembly 48 comprises a rotatable seal ring 51 and a non-rotatable seal ring 52, the mechanical seal assembly 48 being essentially of the same general construction as each of the stages of the multi-stage mechanical seal assembly 10. Further description is deemed unnecessary, except to state that the seal rings 51 and 52 are assembled in situ onto the seal sleeve 18. Passage means 54 in the auxiliary housing are provided to permit the passage of leakage fluid from the assembly.

A novel positive driving connection 56 is provided between the shaft 22 and the seal sleeve 18 and the motor coupling 42. The driving means 56 comprises an outer extension sleeve 58 and an inner drive sleeve 60, the latter being encircled by the former.

Figure 2:
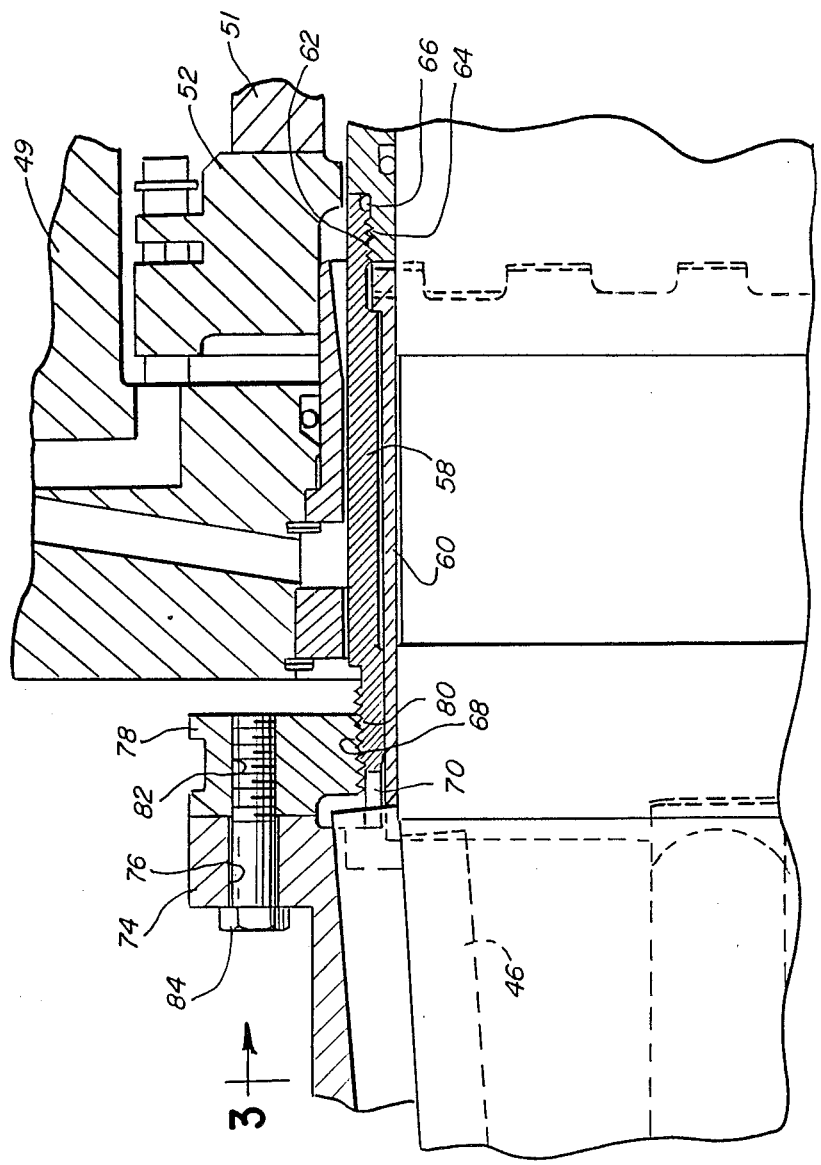
FIG. 2 is an enlarged axial sectional view showing the means drivingly connecting the seal shaft and seal sleeve to the motor coupling.

The extension sleeve 58 is provided, at the seal end, with internal threads 62 which mate with external threads 64 on a terminal part of the seal sleeve 18, the point being sealed by an elastomeric O-ring 66. The opposite and motor end of the extension sleeve 58 has external threads 68 and axially extending slots 70, the latter being received by coupling key extensions 72 formed in the motor coupling 42. The coupling 42 is also formed with a radial flange 74 having one or more bolt holes 76 (one being illustrated in FIGS. 1A and FIG. 2) and an adjusting ring 78 encircles the extension sleeve 58. The adjusting ring 78 is formed with internal threads 80 which mate with the external threads 68 on the extension sleeve 58. The ring 78 is formed with a plurality of bolt holes 82, so that, when the relative positions of the extension sleeve and the motor coupling are adjusted by means of the adjusting ring 78, one or more bolts 84 are used to connect the flange 74 and the adjusting ring 78.

The inner drive sleeve 60 is constructed at its ends with a plurality of slots or notches 86 and 88 adapted to receive, respectively, drive members 90 in the seal sleeve 18, and one or more keys 46 of the motor coupling 42. The keys also couple the coupling parts 44 and 45. The keys and slots or keyways permit adjustment of the coupling parts rotationally with respect to one another.

Because of the construction above described, a positive drive connection is provided between the fluid machine and the motor. The extension sleeve 58 transmits axial forces from the sleeve 18 to the adjusting ring 78 by means of the helical threads 62 and 68 at its opposite ends. The inner drive sleeve 60 with notches 86 and 88 at opposite ends engages the coupling drive key 46 at its lower extension and the drive members 90 of the shaft sleeve 18 at its other end. 'Thus the torsional drive is from the coupling key 46 to the inner sleeve 60 to the lower sleeve 18. The axial thrust is from the lower sleeve 18 to the connective sleeve 58 to the adjusting ring 78 to the coupling 42 to the motor 43. The adjusting arrangement provided by the flange 74 of the motor coupling and the extension sleeve 58 avoids large axial assembly clearances and, further, by fixing relative positions of the component parts, positively prevents the drive sleeve 60 from disengaging the keys 46 and drive members 90, thus insuring the transmission of the torsional forces between the motor and the fluid machine.

The appended claims are intended to cover all reasonable equivalents and are to be interpreted as broadly as the prior art will permit.

I claim:

1. In a fluid handling apparatus comprising a fluid machine connected by a drive shaft and a coupling to a motor, and a multistage mechanical seal assembly for progressively reducing the pressure of any leakage of product fluid along said shaft toward said motor, said mechanical seal assembly encircling a seal sleeve which surrounds said shaft and which is rotatable therewith, the improvement comprising:

an extension sleeve between said drive shaft and said coupling;

means providing a positive driving connection between said extension sleeve and said seal sleeve;

means providing a positive driving connection between said extension sleeve and said coupling;

a drive sleeve between said shaft and said coupling and being encircled by said extension sleeve;

means providing a positive driving connection between said drive sleeve and said seal sleeve;

means providing a positive driving connection between said drive sleeve and said coupling;

said drive sleeve transmitting torsional forces between said shaft and said coupling and said extension sleeve transmitting axial thrust to said seal sleeve; and an additional seal assembly encircling said extension sleeve to maintain a substantially constant exit pressure for the last of the stages of said multi-stage mechanical seal assembly 2. In a fluid handling apparatus as recited in claim 1, further comprising a housing surrounding said multi-stage mechanical seal assembly and an auxiliary housing surrounding said additional mechanical seal assembly.

3. In a fluid handling apparatus as recited in claim 1, in which the pressure drop across each of the mechanical seal assemblies in the multi-stage mechanical seal assembly is substantially equal, and said additional mechanical seal assembly comprises a relatively low pressure mechanical seal.

4. In a fluid handling apparatus as recited in claim 1, in which each mechanical seal of said multi-stage mechanical seal assembly comprises a seal ring connected for rotation to said seal sleeve and thus to said shaft, and a non-rotating seal ring, said seal rings of each mechanical seal being constructed with faces which oppose one another.

5. In a fluid handling apparatus as recited in claim 1, further comprising threads on said seal sleeve and mating threads on said extension sleeve to provide the positive driving connection therebetween.

6. In a fluid handling apparatus as recited in claim 1, further comprising interengaging members on opposing portions of said seal sleeve and said drive sleeve to provide the positive driving connection therebetween.

7. In a fluid handling apparatus as recited in claim 1, further comprising interengaging members on opposing portions of said drive and extension sleeves and said coupling to provide the positive driving connection.

8. In a fluid handling apparatus as recited in claim 1, further comprising a threaded portion on an outer portion of said extension sleeve and mating threaded adjusting ring operatively associated with said coupling.

9. In a fluid handling apparatus as recited in claim 8, further comprising bolt means connecting said adjusting ring and said coupling after the adjustment of the axial position of said extension sleeve.

10. In a fluid handling apparatus as recited in claim 1, further comprising means operatively associated with said additional mechanical seal assembly for bleeding-off any leakage therefrom.

11. In a fluid handling apparatus as recited in claim 1, further comprising a housing into which said multi-stage mechanical seal assembly is received as a cartridge, and further comprising an auxiliary housing connected to said housing and wherein said additional seal assembly is assembled part by part in situ.

12. A fluid handling apparatus comprising:
a housing;
a fluid machine in said housing;
a shaft connected to said fluid handling machine;
a motor connected to said shaft for driving said fluid machine;
a mechanical seal cartridge positioned in said housing between said fluid machine and said motor;
said mechanical seal cartridge comprising a seal sleeve encircling said shaft and rotatable therewith, and a plurality of mechanical seals, each having a pair of seal rings with opposing seal faces;
an extension sleeve having a positive driving connection with said seal sleeve and thus said motor;
an additional mechanical seal operatively associated with said extension sleeve for maintaining a substantially constant exit pressure for the last of said mechanical seals;
a coupling for connection to said motor and to said shaft;
means providing a positive driving connection between said extension sleeve and said coupling and being adjustable for axially positioning said coupling with respect to said extension sleeve;
a drive sleeve between said shaft and said coupling;
means for providing a driving connection between said seal sleeve and said drive sleeve; and
means for providing a driving connection between said coupling and said drive sleeve.

13. A fluid handling apparatus as recited in claim 12, further comprising an auxiliary housing connected to said housing, and further comprising passageway means in said auxiliary housing for bleed-off of leakage from said additional mechanical seal assembly.

14. A fluid handling apparatus as recited in claim 12, wherein said additional mechanical seal assembly is assembled part by part in situ.

* * * * *